March 27, 1928.

A. C. WARD

POTTERY KILN

Filed May 4 1927

1,664,142

2 Sheets-Sheet 1

Inventor
Albert C. Ward,

By Clarence A. O'Brien
Attorney

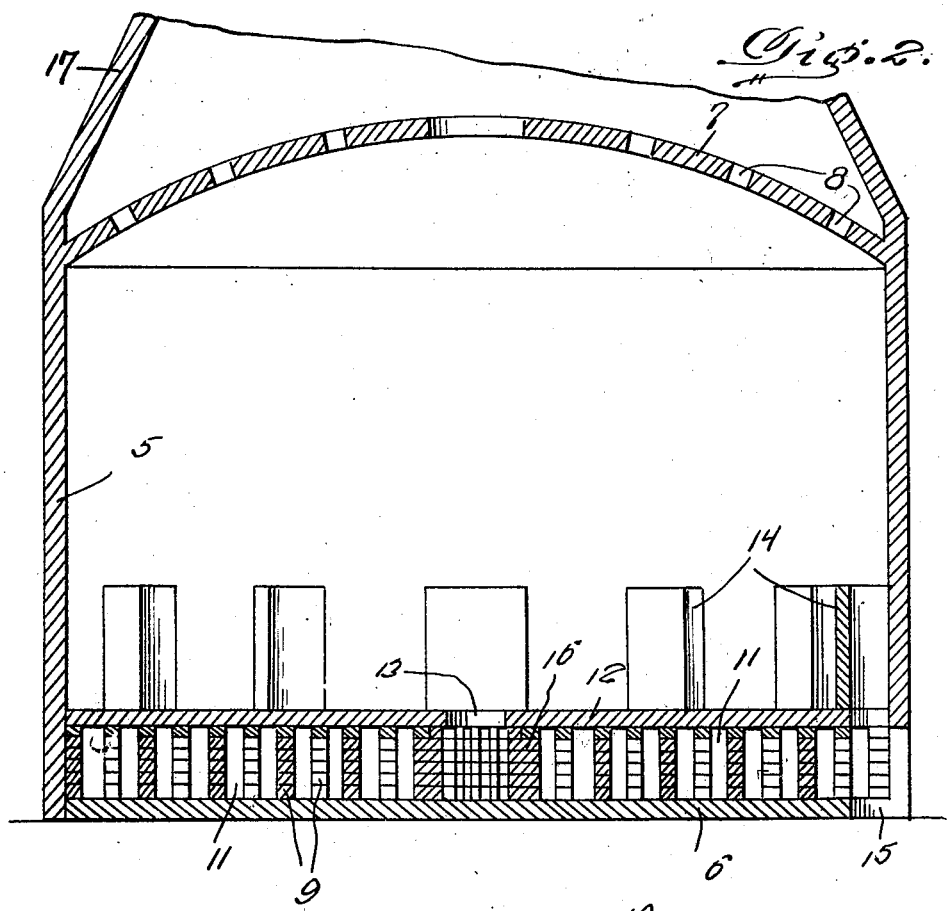
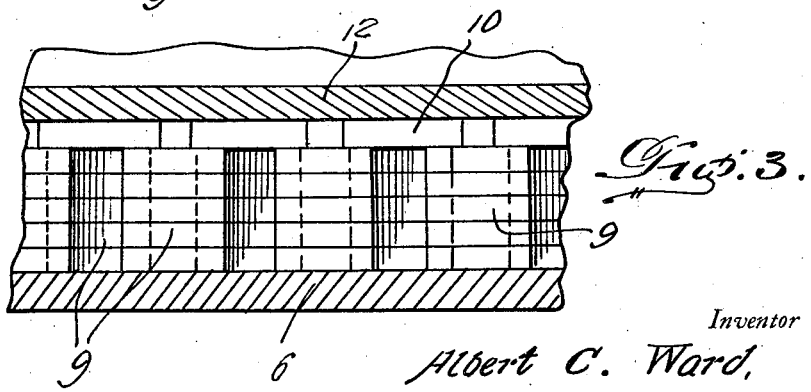

Patented Mar. 27, 1928.

1,664,142

UNITED STATES PATENT OFFICE.

ALBERT C. WARD, OF CANONSBURG, PENNSYLVANIA.

POTTERY KILN.

Application filed May 4, 1927. Serial No. 188,769.

My invention relates to pottery kilns and has for its object to provide a heating system for the floor thereof adapted to uniformly transmit the heat to all parts of the floor, both above and beneath the same, so that the temperature of the floor throughout will be uniformly maintained. This is an important feature in the drying of pottery or the like in order that the entire output of a kiln may be uniformly dried and hardened.

Another object is to provide a series of circularly arranged tiers for supporting flues immediately beneath the pottery floor, said tiers being disposed in staggered relation whereby to deflect the heat and induce the same to circulate beneath the kiln floor in all directions, the flues being adapted to pocket and retain a portion of the heat so that the entire underside of the floor will be subjected to the heating action.

Figure 1:
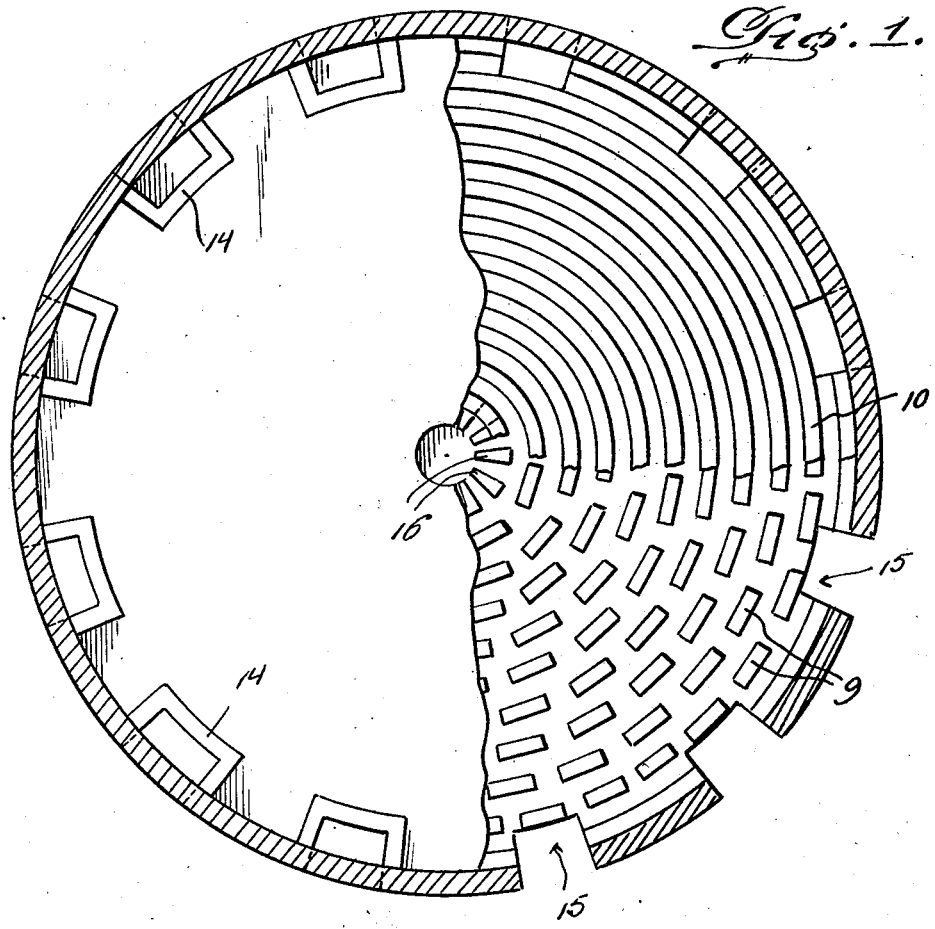
Figure 4:
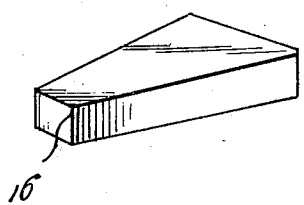

Other objects and advantages will become apparent from the following detailed description when viewed together with the accompanying drawings forming a part hereof, wherein like numerals refer to like parts throughout and in which:

Figure 1 is a plan view of the pottery floor of a kiln with parts broken away to illustrate the arrangement of the tiers and flues, Figure 2 is a vertical sectional view thereof, Figure 3 is a fragmentary sectional view taken substantially along the line 3—3 of Figure 1, and Figure 4 is a perspective view of one of the central flue tiers.

Referring now to the drawings I have shown my invention for use in conjunction with a kiln of conventional construction and comprising vertical walls 5, a base 6, and a roof 7 having the usual vent holes 8. The kiln is circularly constructed and within the same and upon the base 6 I provide a plurality of rows of tiers 9 circularly arranged in spaced apart relation, the tiers of each row being disposed in staggered relation with respect to the tiers of the adjacent rows so that tortuous passages are formed between said rows. Each of the tiers preferably comprises a built-up section of firebricks and any suitable number of tiers may be provided depending upon the size of the particular kiln.

Upon the top of each row of tiers I arrange a flue 10 comprising a continuous circular section likewise constructed of firebrick, the flues being arranged in spaced relation so as to form pockets 11 therebetween. Upon the flues is mounted a pottery floor 12 having a centrally disposed flue 13 communicating with the passages beneath the same and around the edges of the floor 12 are arranged a plurality of bags 14. The bags are in the nature of shields extending upwardly above the floor 12 and open at their upper and lower ends, the upper end thereof communicating with the interior of the kiln and the lower end communicating with fire pit 15 within which the heat for the kiln is generated.

The innermost row of tiers is of a slightly different construction from the remainder thereof, being built up in a substantially wedge shaped formation, spaced apart and radially disposed with respect to the central flue 13. The construction of such tiers indicated at 16 is clearly illustrated in Figure 4 of the drawing.

It will be noted that the firepit 15 has direct communication with the passages between the tiers. Part of the heated air generated by the fire in the pit will enter the space between the floor 12 and the base 6 and the remainder of the air will travel upwardly through the bags 14 directly into the pottery chambers above the floor. The vents 8 permit the escape of the accumulation of heated air into the stack 17 and out through the top thereof. In this manner the heat will circulate beneath the pottery floor 12 and pass between the tiers in traveling toward the central flue 13 which acts in the nature of a draft. The flues 10 being continuously formed will operate to retain a portion of the heat in the pockets 11 thereby providing for a constant heat to the floor of the kiln.

The construction thus provided enables the heat to be more thoroughly circulated beneath the floor and the pockets serve to retain a portion of the heat thereby resulting in a more efficient utilization thereof.

I claim:

1. An apparatus of the character described comprising a kiln floor adapted to have heat applied therebeneath, supporting tiers for the floor defining tortuous passages therebetween and flues interposed between the floor and the tiers.

2. In a kiln having a floor arranged therein and adapted to have heat applied therebeneath, circularly arranged supporting tiers for the floor defining tortuous passages therebetween and continuously formed circular flues interposed between the floor and the tiers and arranged in spaced relation whereby to form heat retaining pockets therebetween.

3. In a kiln having a floor mounted therein and adapted to have heat applied therebeneath, a plurality of rows of supporting tiers for the floors circularly arranged in spaced apart relation, the tiers of each row being staggered with respect to the tiers in the adjacent row and forming tortuous passages therebetween and a continuously formed circular flue interposed between the floor and each of said rows of tiers whereby to form heat retaining pockets therebetween.

In testimony whereof I affix my signature.

ALBERT C. WARD.